United States Patent [19]

Komatsu

[11] Patent Number: 5,239,470
[45] Date of Patent: Aug. 24, 1993

[54] DATA RECORDING METHOD AND DEVICE
[75] Inventor: Toshio Komatsu, Shimada, Japan
[73] Assignee: Yazaki Corporation, Tokyo, Japan
[21] Appl. No.: 651,830
[22] Filed: Feb. 7, 1991
[30] Foreign Application Priority Data Feb. 8, 1990 [JP] Japan .................................. 2-27192
Mar. 14, 1990 [JP] Japan .................................. 2-61218

[51] Int. Cl.$^5$ .............................................. G06F 15/74
[52] U.S. Cl. .......................... 364/424.04; 364/715.02; 382/56
[58] Field of Search ...................... 364/424.04, 715.02; 375/28, 122; 382/56, 26, 37; 341/51, 75, 138; 358/426, 433

[56] References Cited

U.S. PATENT DOCUMENTS 4,524,456 6/1985 Araki et al. ............................. 382/56
4,550,438 10/1985 Convis et al. .......................... 382/56
4,839,649 6/1989 Imai et al. .............................. 375/28

FOREIGN PATENT DOCUMENTS 63-157296 7/1988 Japan .

Primary Examiner—Gary Chin
Attorney, Agent, or Firm—Armstrong, Westerman, Hattori, McLeland & Naughton

[57] ABSTRACT

Data recording device including a sampling device for sampling data to be recorded at a predetermined period, a permissible error range calculating device for calculating a permissible error range with respect to the data sampled by the sampling device at each sampling timing, and a recording device for deciding a longest straight line intersecting the permissible error range calculated by the permissible error range calculating device and recording a length of the straight line represented by a sampling number obtained by the sampling device and the data at an end point of the straight line, whereby compression processing of the data sampled is carried out, and the data compressed is recorded. The data recording device further includes a device for detecting an inflection point of the data sampled by the sampling device, wherein when the inflection point is detected by the inflection point detecting device, the compression processing is stopped.

10 Claims, 13 Drawing Sheets

| TOLERANCE | RESOLUTION | A | B | INTEGER PART | FRACTION PART |
|---|---|---|---|---|---|
| ±1 Km/h | 1/8 Km/h | 0 | 0 | 8 BITS | 3 BITS |
| ±1.5 " | 1/4 " | 0 | 1 | 8 " | 2 " |
| ±2.0 " | 1/2 " | 1 | 0 | 8 " | 1 " |
| ±2.5 " | 1 " | 1 | 1 | 8 " | 0 " |

FIG.14

| 7 | | 0 |
|---|---|---|
| START TIME, YEAR | | |
| A | B | MONTH |
| DAY | | |
| HOUR | | |
| MINUTE | | |
| SECOND | | |
| SPEED (0~191 Km/h) | | |
| SPEED | SAMPLING NUMBER | |
| SPEED (0~191 Km/h) | | |
| SPEED | SAMPLING NUMBER (LOW-ORDER DIGITS) | |
| 11 | SAMPLING NUMBER (HIGH-ORDER DIGITS) | |
| END TIME, YEAR | | |
| MONTH | | |
| DAY | | |
| HOUR | | |
| MINUTE | | |
| SECOND | | |

DATA RECORDING METHOD AND DEVICE

BACKGROUND OF THE INVENTION

The present invention relates to a data recording method and device for recording data such as speed data of a vehicle.

Conventionally, a tachograph is used to record a travel circumstance of a vehicle. The tachograph is designed in such that a vehicle speed, travel distance, engine speed, etc. are recorded in an analog fashion by a recording needle on a circular small recording paper rotating at 360° per 24 hours.

However, the record on the small recording paper obtained by such an analog tachograph should be read manually to require much labor. Furthermore, skill is required for reading of the record, and personal error is generated in reading of the record to cause variations. Moreover, as the totalization of the record obtained should be occasionally carried out by manual calculation, travel control becomes very troublesome.

To solve this problem, it is considered to carry out digital signal processing. However, in the case of recording an instantaneous speed of a vehicle, a memory of a large capacity is required. For instance, assuming that one byte is required for storage of one speed data and that a sampling period for obtaining the instantaneous speed is 0.25 second, an amount of data for 24 hours becomes as follows:

Amount of data for 24 hours = (1 second/0.25 second) × 3600 seconds × 24 hours
= 345,600 bytes It is impractical to mount a memory having such a large capacity on a vehicle equipment.

To solve this problem, there has been proposed a device for obtaining a permissible error range with respect to data at each sampling timing, obtaining a longest straight line intersecting the permissible error range, and recording a length of the straight line represented by a sampling number and the data at an end point of the straight line.

In the case that the above device is applied to a speedometer of a vehicle, the Japanese Road Traffic Act admits a permissible error range of ±10% or less for a vehicle speed of 35 km/h or more in the speedometer. Accordingly, it is sufficient for the digital tachograph to have the same error range. In the above device, the permissible error range with respect to each sampling speed is obtained, and the straight line intersecting the permissible error range is drawn. Accordingly, vehicle speed information in the permissible error range is represented by this straight line. Further, the length of the straight line is recorded as the sampling number, and the data at the end point of the straight line is also recorded, thereby periodically controlling the vehicle speed in a period covered by the straight line. Thus, since the vehicle speed is recorded by only recording the length of the straight line and the end data of the straight line, much information can be stored with a small amount of data, thus realizing data compression.

The data compression processing as mentioned above will now be described with reference to FIG. 17. In FIG. 17, $t_0$ to $t_{11}$ denote sampling timings; $V_0$ to $V_{11}$ denote vehicle speeds at the sampling timings $t_0$ to $t_{11}$, respectively; and a dashed line at each vehicle speed denotes a permissible error range. At each present sampling timing, it is determined whether or not there exists a straight line intersecting the permissible error range of the data at the previous sampling timing. As shown in FIG. 17, it is understood that there exists a straight line intersecting the permissible error range during the period of $t_0$ to $t_9$, but the straight line does not intersect the permissible error range at the sampling timing $t_{10}$. In this case, a straight line $L_1$ connecting a start point $V_0$ and a lower limit of the permissible error range is drawn, and another straight line $L_2$ connecting the start point $V_0$ and an upper limit of the permissible error range is also drawn. A middle point V of the range between the straight lines $L_1$ and $L_2$ at the sampling timing $t_9$ is decided as the end data, and the sampling number of "9" is decided as the length of the straight line. In the next stage, the operation similar to the above is carried out. The middle point or end point obtained in the first stage is used as a start point of a straight line to be drawn in the next stage.

In the above compression processing, it is determined whether or not the straight line intersecting the permissible error range at the previous sampling timing also intersects the permissible error range at the present sampling timing. If the straight line intersects the permissible error range at the present sampling timing, the compression processing is continued, while if not, the compression processing is stopped (interrupted). Therefore, there is a possibility that an extended waveform of sampling data after the compression processing is largely deflected from an orginal waveform before the compression processing at inflection points.

FIG. 18 shows a graph of the extended waveform (denoted by a dashed line b) and the original waveform (denoted by a solid line a) of vehicle speed sampled. It is understood from FIG. 18 that the extended waveform is largely deflected from the original waveform at inflection points $x_1$, $x_2$ and $x_3$. In this case, the permissible error range is set to 2 km/h, and the sampling period is set to 0.5 second. Such a phenomenon remarkably appears under a running condition where a rapid speed change is little such as in running on an express highway or automobile road.

Meanwhile, FIG. 19 shows a format of recording the compressed speed data into a recording medium in the prior art. At the beginning of data collection, a start time consisting of year, month, day, hour, minute and second, and an initial speed $V_0$ are recorded by using total seven bytes as shown by an area a. The initial speed $V_0$ is used as a start point of a straight line to be drawn for the compression processing of the speed data. Then, as shown by an area b subsequent to the area a, a sampling number representing a length of the straight line is recorded by using one byte, and the compressed speed data is then recorded by using one byte. The subsequent sampling numbers and speed data are similarly recorded after the area b.

As to the single byte to be used for recording the speed data, a leftmost one bit is used for recording a unit distance travel flag. When a vehicle travels a given distance, the unit distance travel flag is set to 1, while in the other cases, it is set to 0. Accordingly, the speed data as a speed (0–127 km/h) at an end point of the straight line is recorded as a binary number by using the remaining seven bits of this byte.

As mentioned above, it is sufficient to record a vehicle speed with an error range of a speedometer admitted by the Japanese Road Traffic Act. Accordingly, it is generally unnecessary to record a fraction part of the vehicle speed. However, in the case that a user desires to reduce a tolerance of the speed data down to ±1.5 km/h or ±1.0 km/h, for example, a resolution of the speed data must be correspondingly increased up to ¼ or ⅛, and it becomes necessary to additionally record the fraction part of the speed data.

In the above-mentioned conventional data recording method, however, both a length of the speed data and a length of the sampling number data are fixed. Therefore, in the case that the fraction part of the speed data is intended to be additionally recorded under the condition that only two bytes are used for recording the speed data and the sampling number data, the length of the sampling number data becomes short. For example, when three bits are used for recording the fraction part, a maximum value of the sampling number represented by a binary number becomes 31. Thus, the possibility of data compression is reduced.

If the length of the speed data or the sampling number data is increased, it becomes necessary to always use three bytes for recording the speed data and the sampling number data. Thus, the effect of data compression is largely reduced.

SUMMARY OF THE INVENTION

It is a first object of the present invention to provide a data recording method and device which can make an extended waveform of sampling data after compression processing approximate to an original waveform without so large deflection at inflection points.

It is a second object of the present invention to provide a speed data recording method and device which can avoid a reduction in data compression effect and effectively use a recording capacity of a recording medium even when a data length becomes large due to the necessity of a fraction part of the speed data according to the tolerance in the compression processing of the speed data.

According to a first aspect of the present invention achieving the first object, there is provided in a data recording method including the steps of sampling data to be recorded at a predetermined period, calculating a permissible error range with respect to the data at each sampling timing, deciding a longest straight line intersecting said permissible error range calculated, and recording a length of said straight line represented by a sampling number and the data at an end point of said straight line, whereby compression processing of the data sampled is carried out, and the data compressed is recorded; the improvement comprising the step of detecting an inflection point of the data obtained in said sampling step, wherein when said inflection point is detected, said compression processing is stopped.

According to the first aspect, as shown in FIG. 1, there is also provided in a data recording device including sampling means 32a for sampling data to be recorded at a predetermined period, permissible error range calculating means 32b for calculating a permissible error range with respect to the data sampled by said sampling means 32a at each sampling timing, and recording means 32c for deciding a longest straight line intersecting said permissible error range calculated by said permissible error range calculating means 32b and recording a length of said straight line represented by a sampling number obtained by said sampling means 32a and the data at an end point of said straight line, whereby compression processing of the data sampled is carried out, and the data compressed is recorded; the improvement comprising inflection point detecting means 32d for detecting an inflection point of the data sampled by said sampling means 32a, wherein when said inflection point is detected by said inflection point detecting means 32d, said compression processing is stopped.

In the above construction, the data sequentially sampled by said sampling means 32a is input into the permissible error range calculating means 32b, and the permissible error range with respect to the data is calculated by the permissible error range calculating means 32b. The recording means 32c decides the longest straight line intersecting the permissible error range and records the length of the straight line represented by the sampling number obtained by the sampling means 32a and the data at the end point of the straight line, whereby the data sampled is compressed. Furthermore, the inflection point of the data sampled is detected by the inflection point detecting means 32d. and upon detection of the inflection point, the compression processing of the data is stopped.

According to a second aspect of the present invention achieving the second object, there is provided in a speed data recording method including the steps of sampling speed data to be recorded at a predetermined period, calculating a permissible error range with respect to the speed data at each sampling timing, deciding a longest straight line intersecting said permissible error range calculated, and recording a length of said straight line represented by a sampling number and the speed data at an end point of said straight line, whereby compression processing of the speed data sampled is carried out, and the speed data compressed is recorded into a recording medium; the improvement wherein said recording step comprises the steps of recording said speed data as a binary number by using a first byte and a part of a second byte, and recording said sampling number as a binary number by using the remaining part of said second byte when the number of digits of said sampling number is not greater than the number of bits of the remaining part of said second byte, while recording low-order digits of said sampling number as a binary number by using all the remaining part of said second byte and recording high-order digits of said sampling number and information for indicating record of said high-order digits of said sampling number by using a third byte when the number of digits of said sampling number becomes greater than the number of bits of the remaining part of said second byte.

According to the second aspect, as shown in FIG. 10, there is also provided in a speed data recording device including sampling means 121d for sampling speed data to be recorded at a predetermined period, permissible error range calculating means 121e for calculating a permissible error range with respect to the speed data sampled by said sampling means 121d at each sampling timing, and recording means 121f for deciding a longest straight line intersecting said permissible error range calculated by said permissible error range calculating means 121e and recording a length of said straight line represented by a sampling number obtained by said sampling means 121d and the speed data at an end point of said straight line, whereby compression processing of the speed data sampled is carried out, and the speed data compressed is recorded into a recording medium 103; the improvement wherein said recording means 121f records said speed data as a binary number by using a first byte and a part of a second byte, and records said sampling number as a binary number by using the remaining part of said second byte when the number of digits of said sampling number is not greater than the number of bits of the remaining part of said second byte, while recording low-order digits of said sampling number as a binary number by using all the remaining part of said second byte and recording high-order digits of said sampling number and information for indicating record of said high-order digits of said sampling number by using a third byte when the number of digits of said sampling number becomes greater than the number of bits of the remaining part of said second byte.

In the above construction, the data sequentially sampled by the sampling means 121d is input into the permissible error range calculating means 121e, and the permissible error range with respect to the sampled data is calculated by the calculating means 121e. The recording means 121f decides the longest straight line intersecting the permissible error range calculated, and records the length of the straight line represented by the sampling number obtained by the sampling means 121d and the data at the end point of the straight line, whereby the data sampled is compressed.

In the compression processing of the data, the recording means 121f records said speed data as a binary number by using a first byte and a part of a second byte, and records said sampling number as a binary number by using the remaining part of said second byte when the number of digits of said sampling number is not greater than the number of bits of the remaining part of said second byte, while recording low-order digits of said sampling number as a binary number by using all the remaining part of said second byte and recording high-order digits of said sampling number and information for indicating record of said high-order digits of said sampling number by using a third byte when the number of digits of said sampling number becomes greater than the number of bits of the remaining part of said second byte.

In this manner, only when the sampling number becomes large, the speed data compressed and the sampling number are recorded by using three bytes. On the other hand, when the sampling number is small, the speed data compressed and the sampling number are recorded by using two bytes in the same manner as the case where no fraction part of the speed data is recorded. Accordingly, the recording capacity of the recording medium can be effectively used.

Other objects and features of the invention will be more fully understood from the following detailed description and appended claims when taken with the accompanying drawings.

BRIEF DESCRIPTION OF THE DRAWINGS

FIGS. 5A to 6C are illustrations for explaining the data compression processing;

FIG. 14 is an illustration for explaining a recording format of compressed data according to the second aspect of the present invention;

DETAILED DESCRIPTION OF THE PREFERRED EMBODIMENTS

There will now be described a first preferred embodiment of the present invention with reference to FIGS. 2 to 9.

Figure 1:
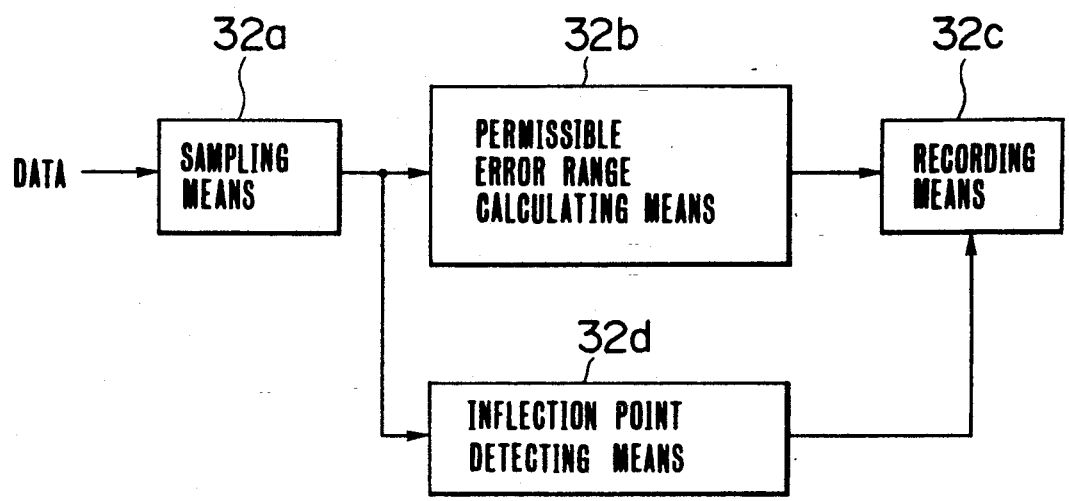
FIG. 1 is a block diagram showing a basic construction of the data recording device according to the first aspect of the present invention.
Figure 2:
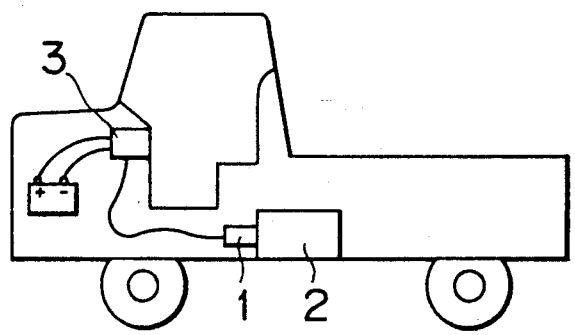
FIG. 2 is a schematic illustration of a data collecting device mounted on a vehicle.
Figure 17:
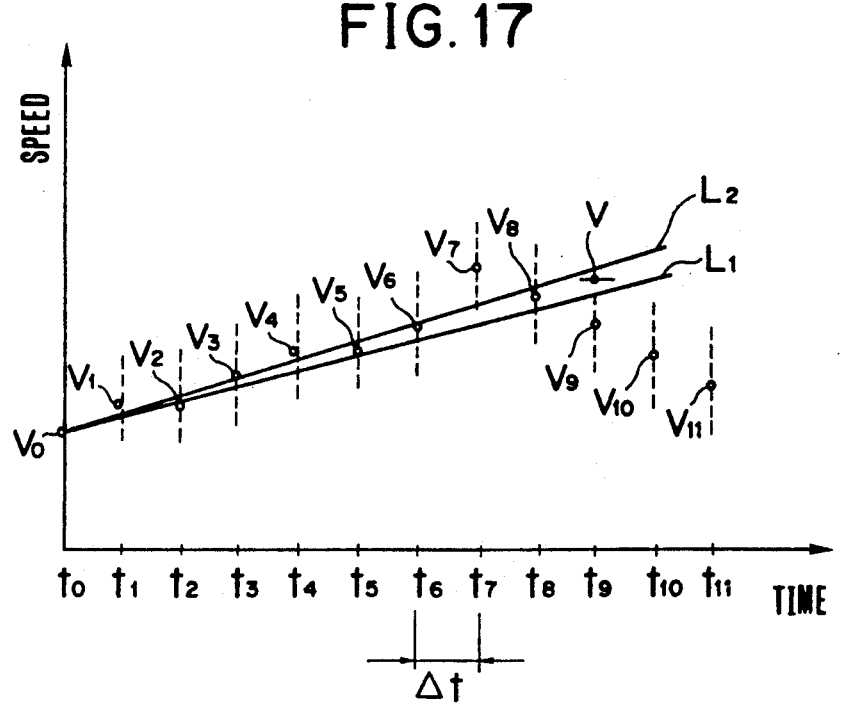
FIG. 17 is a graph for explaining data compression in the prior art.

Referring to FIG. 2 which shows the construction of a digital tachograph as the data recording device embodying the data recording method of the present invention, the digital tachograph includes an axle rotation sensor 1 for detecting rotation of an axle from a transmission 2 of a vehicle and converting a rotational speed of the axle into an electric signal, and a data collecting device 3 for sampling input signals from the axle rotation sensor 1, computing an instantaneous speed and a travel distance, carrying out the data compression processing as mentioned above, and recording compressed data. A compact memory device 4 (see FIGS. 3 and 4) which can be carried by hand is detachably mounted on the data collecting device 3. When the memory device 4 is mounted on the data collecting device 3, travel data can be recorded into the memory device 4.

Figure 3:
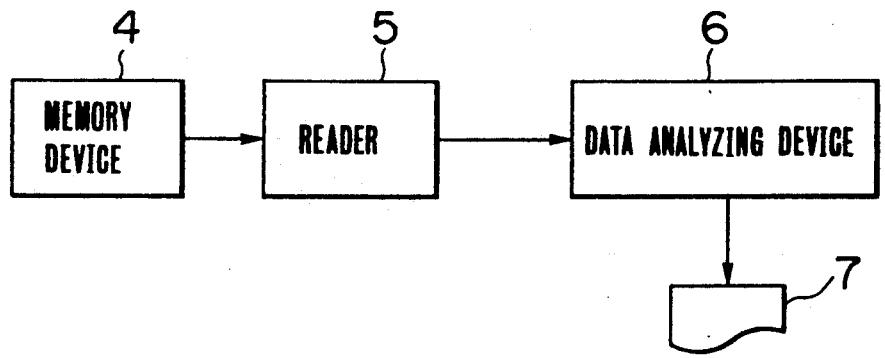
FIG. 3 is a block diagram of a data analyzing device.

Referring to FIG. 3, the memory device 4 detached from the data collecting device 3 is connected to a reader 5. The reader 5 serves to read contents recorded in the memory device 4 and clear the data recorded in the memory device 4 after completion of reading, so as to reset the memory device 4 and make the same re-usable. The reader 5 is connected to a data analyzing device 6. The data analyzing device 6 serves to save the travel data transferred from the reader 5 into a magnetic recording device such as a floppy disk, analyze the compressed data, regenerate the travel circumstance, and print the result of totalization and a graph thereof on an output paper 7.

Figure 4:
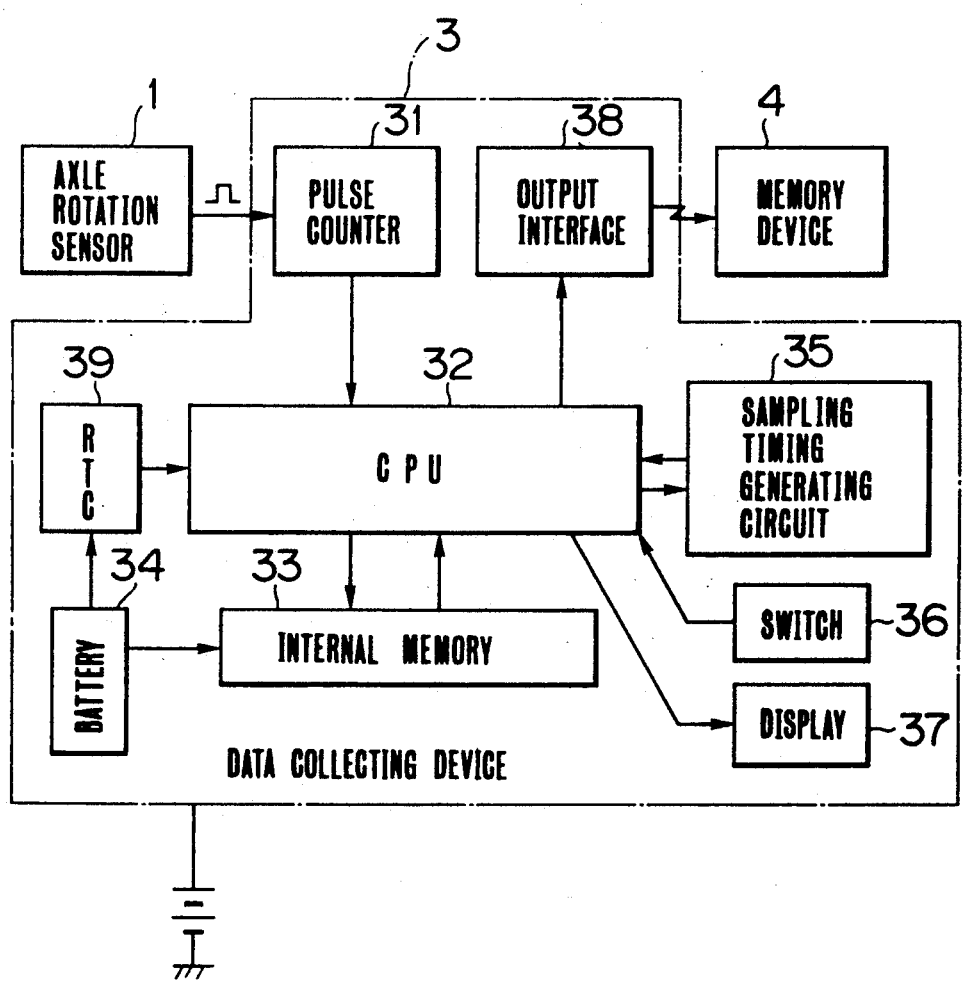
FIG. 4 is a block diagram of the data collecting device.

Referring to FIG. 4, the data collecting device 3 includes a pulse counter 31, CPU 32, internal memory 33, battery 34, sampling timing generating circuit 35, switch 36, display 37, output interface 38 and RTC 39 as a clock for indicating a real time.

When the vehicle mounting the data collecting device 3 as constructed above is traveled, the axle rotation sensor 1 generates pulse signals and supplies the same to the pulse counter 31 of the data collecting device 3. The pulse counter 31 is a device for storing the number of input pulses, and it is designed to recount the pulses from zero when a count value reaches an upper limit. The CPU 32 is a control device for generalizing all functions of the data collecting device, and it is controlled by a software. The CPU 32 monitors a state of the switch 36 for setting a sampling timing and a permissible error range, and instructs the sampling timing generating circuit 35 according to a set value of the sampling period. At the same time, the CPU 32 fetches a set value of the permissible error range and writes the same into the internal memory 33.

The sampling timing generating circuit 35 supplies sampling timing signals to the CPU 32 at the sampling period instructed by the CPU 32. In this preferred embodiment, the sampling period $\Delta t$ is set to 0.5 second. Whenever the CPU 32 receives the sampling timing signal, it reads a present count value of the pulse counter 31 and computes the number of input pulses during the sampling period of 0.5 second according to a difference between the present count value and the previous count value, thereby obtaining an instantaneous speed and a travel distance.

If this data is an initial data at the beginning of data collection, the CPU 32 records time information through the output interface 38 into the memory device 4. As shown by an area a in FIG. 5A, the time information consists of a time information code, year, month, day, hour, minute, second, set value of the sampling period, set value of a permissible speed range, and initial speed $V_0$. The initial speed $V_0$ at this time is a start point of straight lines to be created in the subsequent data compression processing.

The data compression processing to be carried out by the CPU 32 in the data collecting device 3 will now be described with reference to FIGS. 6A to 6C.

Figure 6A:
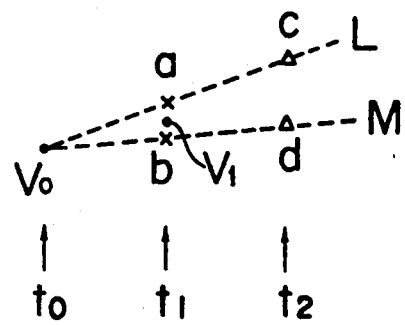

As shown in FIG. 6A, when a speed $v_1$ is obtained at a sampling timing $t_1$, the permissible error set value is added to and subtracted from the speed $v_1$ to compute an upper limit a and a lower limit b, respectively. The upper limit a and the lower limit b are stored into the internal memory 33. Then, a straight line L (shown by a dashed line) connecting the start point $V_0$ and the upper limit a is drawn, and a straight line M (shown by a dashed line) connecting the start point $V_0$ and the lower limit b is also drawn. Then, the straight lines L and M are extended to obtain two points c and d lying on the straight lines L and M at the next sampling timing $t_2$. These points c and d are also stored into the internal memory 33. At this time, a sampling number of 1 is also stored into the internal memory 33.

Figure 6B:
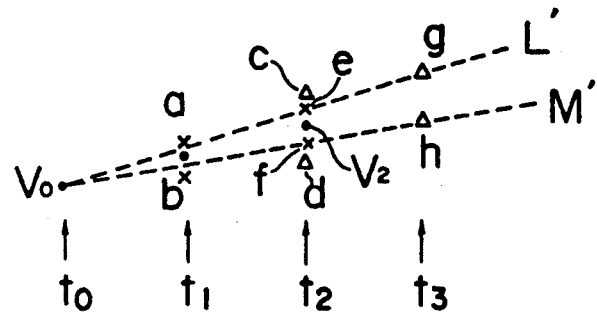

As shown in FIG. 6B, when a speed $v_2$ is obtained at the sampling timing $t_2$, an upper limit e and a lower limit f of the speed $v_2$ are computed in the same manner as at the sampling timing $t_1$. Then, a straight line L' connecting the start point $V_0$ and a smaller one of the two data c and e (i.e., the data e is smaller than the data c in this case) is drawn, and the straight line L' is extended to obtain a point g lying on the straight line L' at the next sampling timing $t_3$. Similarly, a straight line M' connecting the start point $V_0$ and a larger one of the two data f and d (i.e., the data f is larger than the data d in this case) is drawn, and the straight line M' is extended to obtain a point h lying on the straight line M' at the sampling timing $t_3$. At this time, a line segment e-f overlaps a line segment c-d (i.e., the former is included in the latter in this case). Therefore, the sampling number is incremented to obtain a sampling number of 2.

Figure 6C:
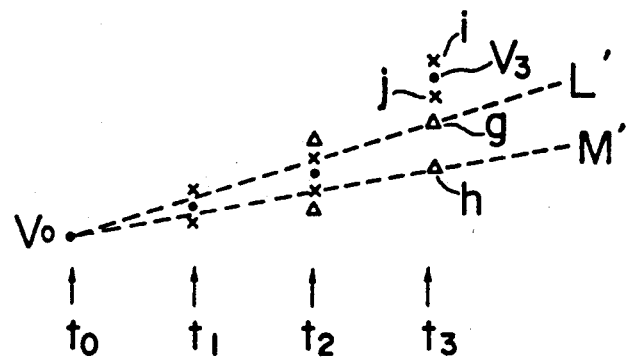

As shown in FIG. 6C, when a speed $v_3$ is obtained at the sampling timing $t_3$, an upper limit i and a lower limit j of the speed $v_3$ are similarly computed. However, a line segment i-j does not overlap the line segment g-h. Therefore, the data compression processing is terminated at this time. The sampling number of 2 counted during the period from the start timing $t_0$ to the sampling timing $t_2$ is stored as a straight line length into the memory device 4. Further, the data at the end point, that is, the speed data $v_2$ located at the middle point of the line segment e-f is also stored into the memory device 4.

Figure 5A:
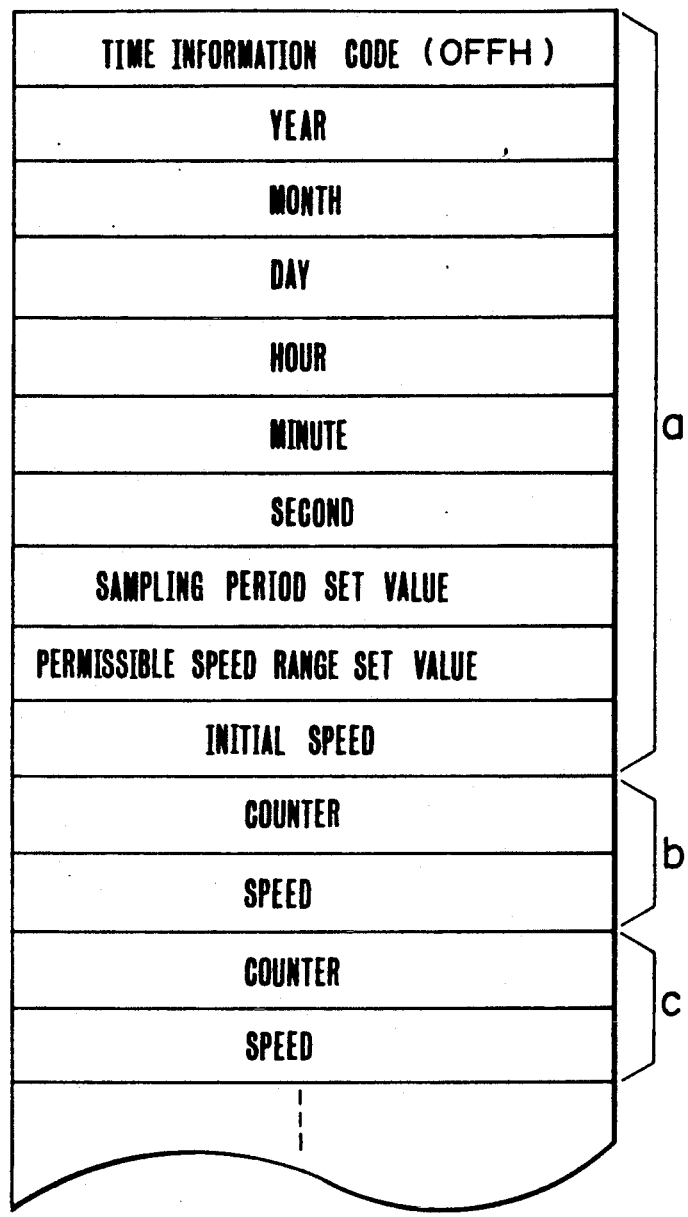
FIGS. 5A to 5C are illustrations for explaining a recording format of data to be recorded into a memory device shown in FIGS. 3 and 4.
Figure 5B:
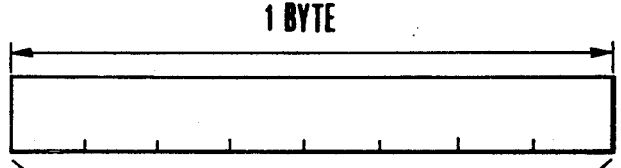
Figure 5C:

Referring to FIG. 5A which shows a data recording format, the above compressed data is recorded in areas b, c, ... subsequent to the time information area a. In the above case, the sampling number of 2 is recorded at COUNTER (1) in the area b, and the speed data $v_2$ is recorded at SPEED ($V_1$) in the area b. FIG. 5B shows a recording format of COUNTER (N) in more detail, wherein it is constituted of one byte having values in the range of $1-FE_{16}$. FIG. 5C shows a recording format of SPEED ($V_N$) in more detail, wherein it is constituted of one byte. A leftmost bit of the byte for recording the speed is allocated to a unit distance travel flag which is set to "1" when the vehicle travels a given distance, while being set to "0" in the other cases. The given distance means 0.1 km, 0.5 km, etc., for example, and it is not especially defined in the preferred embodiment. The remaining seven bits are allocated to the speed data at the end point as represented by values in the range of $0-78_{16}$.

In the next operation, the previous data at the end point (i.e., the speed data $v_2$ in this case) is stored as the next start point of a straight line to be next drawn, into the internal memory 33, and the data e, f, g and h and the sampling number of 2 are cleared. Then, the same operation as above is carried out.

In the preferred embodiment, a maximum value of the sampling number is defined as 254 ($FE_{16}$), and when the count value of the sampling number stored in the internal memory 33 becomes maximum, the CPU 32 computes an end point of the straight line and records the compressed data (in the format of COUNTER (N=254) and SPEED $V_N$ as shown in FIG. 5A) through the output interface 38 into the memory device 4.

Figure 7:
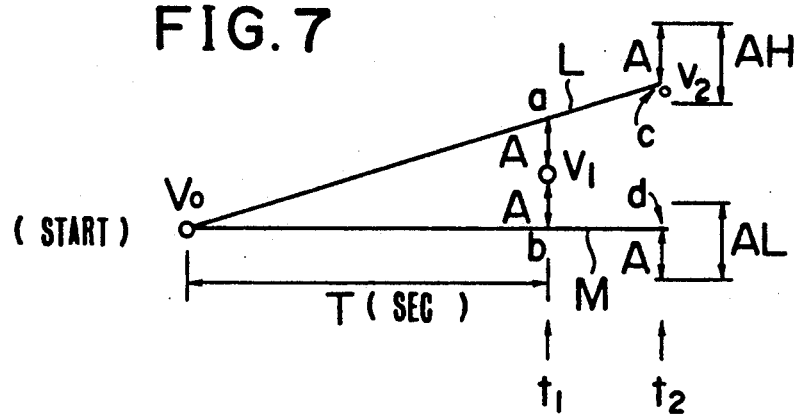
FIG. 7 is an illustration for explaining the inflection point detecting processing.

A further inflection point detecting processing will now be described with reference to FIG. 7. It is assumed that the speed $V_1$ is obtained at the sampling timings $t_1$ to $t_3$, as shown in FIG. 7, and that the permissible error range is denoted by A. A straight line L starting from an initial speed $V_0$ and passing through an upper limit of the upper permissible error range A of the speed $V_1$ is drawn, and a straight line M starting from the initial speed $V_0$ and passing through a lower limit of the lower permissible error range A of the speed $V_1$ is also drawn. Two points c and d lying on the straight lines L and M, respectively are obtained at the next timing $t_2$. Then, predetermined ranges AH and AL from the points c and d are set, respectively. The predetermined range AH is defined by adding permissible error range A above the point c and an appropriate error range below the point a as depicted.

The predetermined range AL is defined by adding permissible error A below the point d and an appropriate error range above the point d as depicted. It is determined whether or not a speed $V_2$ obtained at the sampling timing $t_2$ is included in the range AH or AL. If the subsequent speeds to be sampled continuously N times are included in the range AH or AL, it is determined that the speed $V_2$ is an inflection point, and the above data compression processing is stopped (interrupted).

To prevent a reduction in compression efficiency, the above inflection point detecting processing is not carried out during a period T (sec) until a direction of a given sampling data waveform is defined after the start of the data compression processing. Further, if sampled data is included in the range AH or AL during the period T, the inflection point detecting processing is not carried out after the period T. Although the ranges AH and AL are greater than the permissible error range A in FIG. 7, they may be set to be equal to or less than the permissible error range A.

Figure 8:
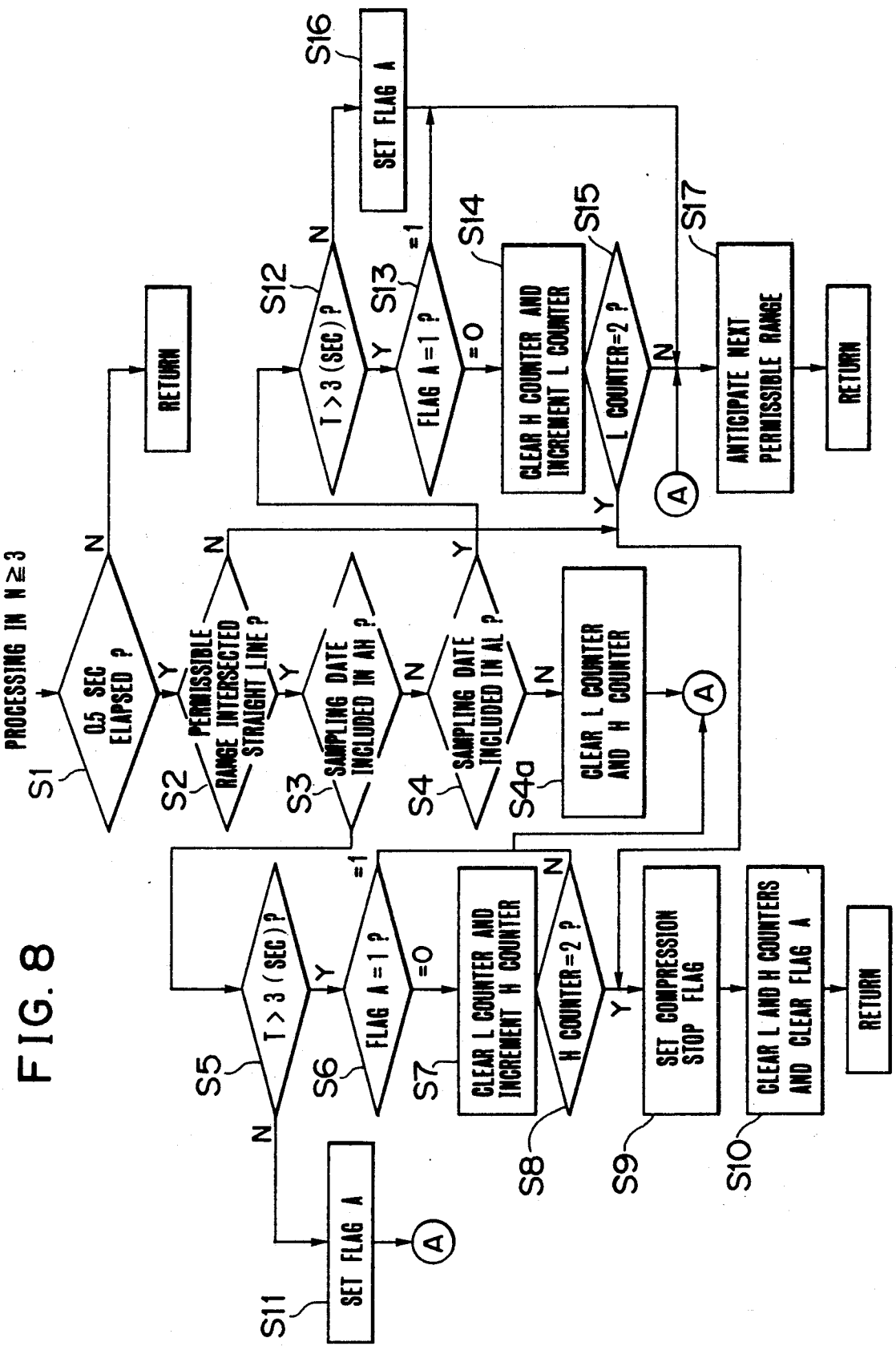
FIG. 8 is a flowchart of the operation to be carried out by a CPU shown in FIG. 4.

The above processing for interruption of the data compression to be carried out by the CPU 32 will now be described in more detail with reference to the flowchart shown in FIG. 8, wherein the values N and T are set to N=2 (times) and T=3 (seconds), and the sampling period is set to 0.5 second. The flowchart in FIG. 8 shows the processing for vehicle speeds sampled in case of N≧3. The CPU 32 includes an H counter, L counter, flag A and compression stop flag. In the initial condition, each counter is reset, and each flag is set to 0.

In step S1, it is determined whether or not 0.5 second has elapsed. If the answer in step S1 is YES, the program proceeds to step S2, and it is determined whether or not the permissible error range A at the sampled vehicle speed intersects the straight line L. If the answer in step S2 is YES, it is determined in step S3 whether or not the sampled vehicle speed is included in the predetermined range AH. If the answer in step S3 is YES, the program goes to step S5, and it is determined whether or not T seconds have elapsed. If the answer in step S5 is NO, the flag A is set to 1 in step S11. If the answer in step S5 is YES, it is determined in step S6 whether or not the flag A is 1. If the flag A is 0, the L counter is cleared and the H counter is incremented by 1 in step S7. Then, it is determined in step S8 whether or not the H counter is 2. If the answer in step S8 is YES, the compression stop flag is set to 1 in step S9 to stop the compression processing. In the next step S10, the L and H counters are cleared, and the flag A is set to 0.

If the answer in step S3 is NO, the program proceeds to step S4, and it is determined whether or not the vehicle speed is included in the predetermined range AL. If the answer in step S4 is NO, the L counter and the H counter are cleared in step S4a, while if the answer in step S4 is YES, the program goes to step S12 and it is determined whether or not T seconds have elapsed. If the answer in step S12 is NO, the flag A is set to 1 in step S16. If the answer in step S12 is YES, it is determined in step S13 whether or not the flag A is 1. If the flag A is 0, the H counter is cleared and the L counter is incremented by 1 in step S14. Then, it is determined in step S15 whether or not the L counter is 2. If the answer in step S15 is YES, the program proceeds to step S9.

The program proceeds to step S17 after the execution of steps S11 to S16, if the flag A is 1 in step S6 or S13, if the H counter is not 2 in step S8, if the sampling data is not included in the range AL in step S14, or if the L counter is not 2 in step S15. In step S17, a permissible error range in the next sampling timing is anticipated.

Figure 9:
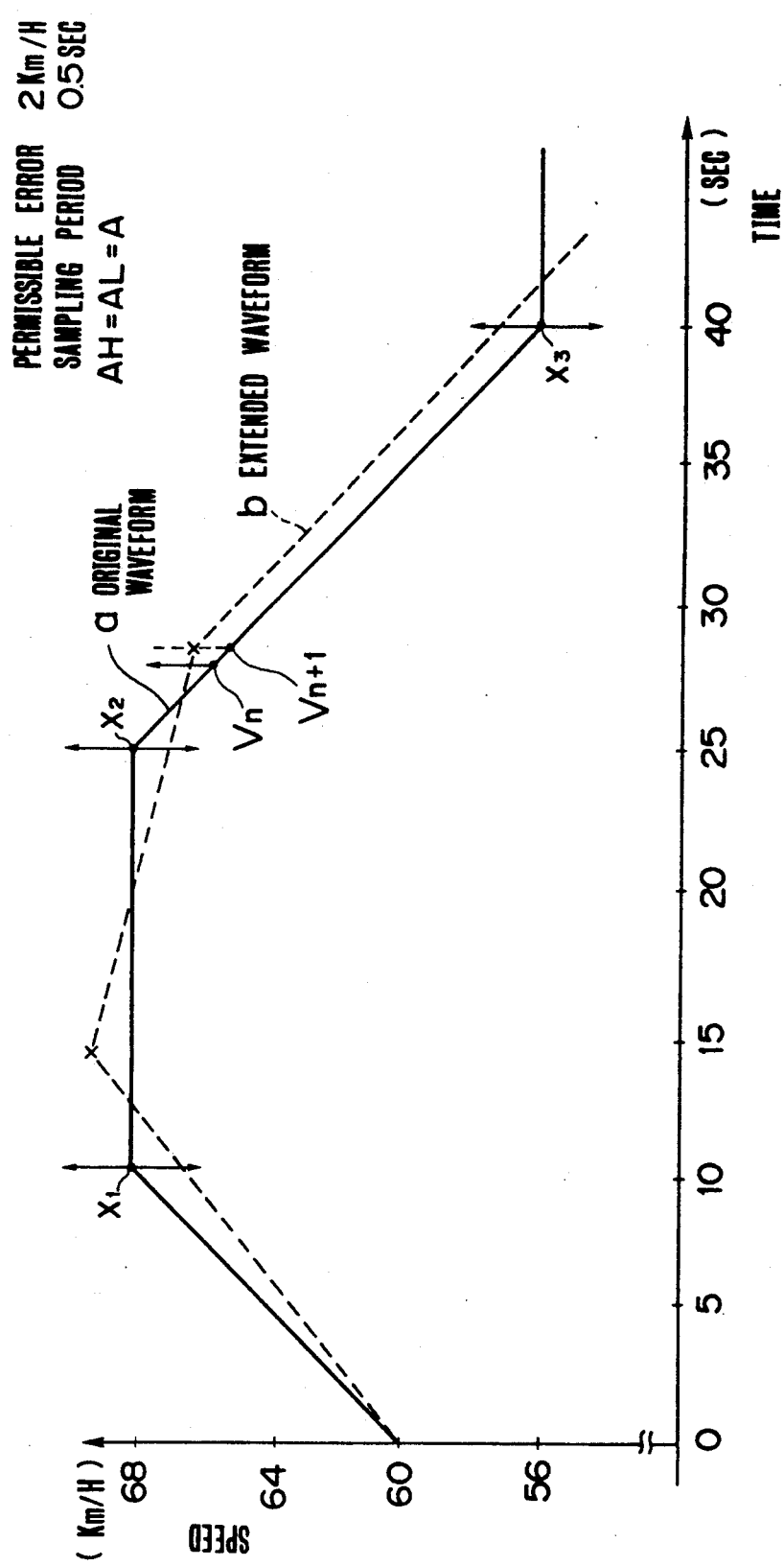
FIG. 9 is a graph showing an extended waveform and an original waveform of sampling data according to the present invention.

Referring to FIG. 9, a graph a shown by a solid line denotes an original waveform of the sampling data before the data compression processing, and a graph b shown by a dashed line denotes an extended waveform of the sampling data after the data compression processing. It is apparent from FIG. 9 that the extended waveform b is approximated to the original waveform a without so large deflection from the latter at inflection points $x_1$, $x_2$ and $x_3$.

In the vicinity of the inflection point $x_2$, for example, the permissible error ranges of sampled vehicle speeds $V_n$ and $V_{n+1}$ intersect the anticipated straight lines. As the sampled vehicle speeds $V_n$ and $V_{n+1}$ are included in the range AL, the compression processing is stopped at the sampling timing of the vehicle speed $V_{n+1}$.

Figure 18:
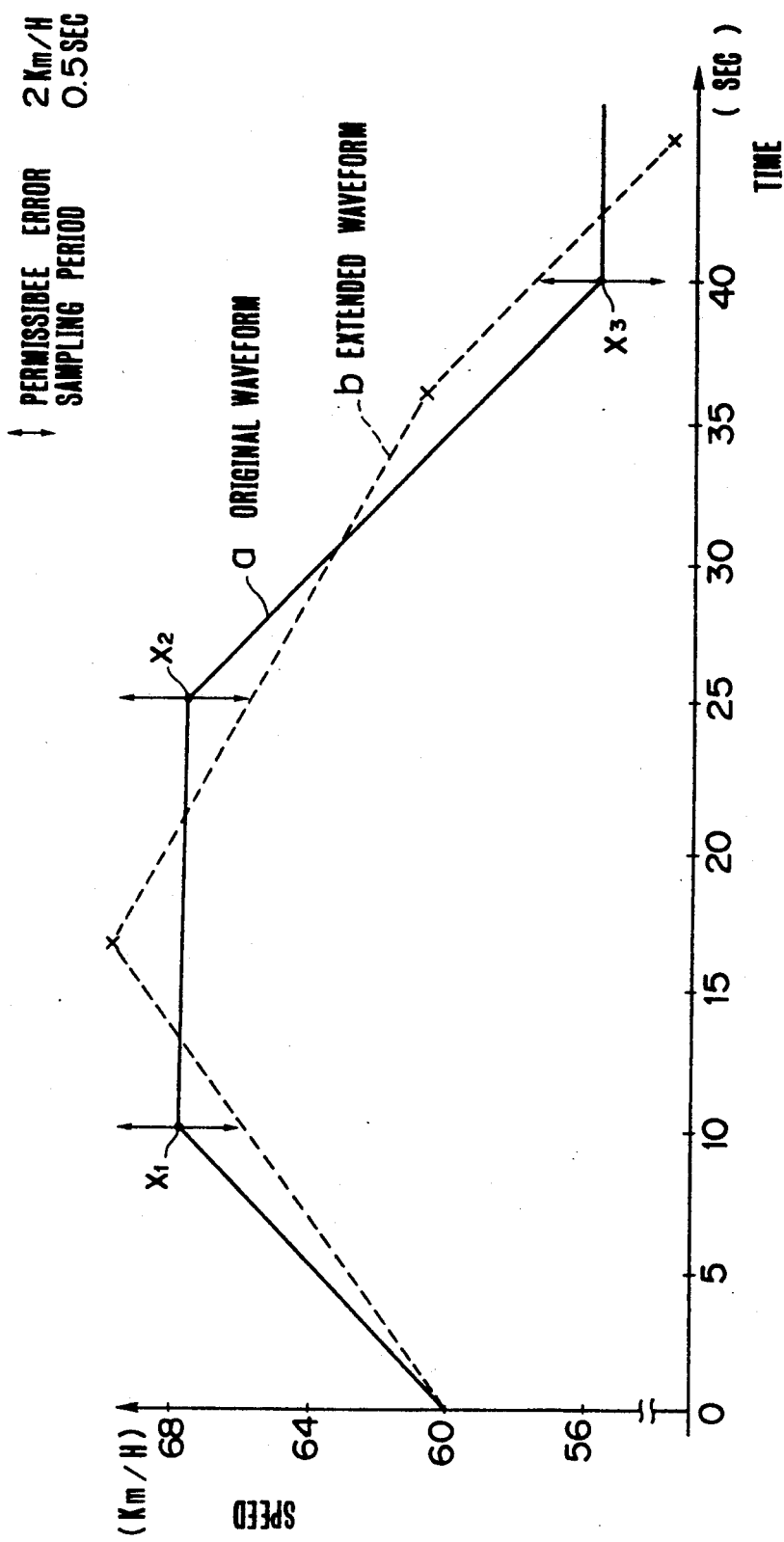
FIG. 18 is a graph showing an extended waveform and an original waveform of sampling data in the prior art.
Figure 19:
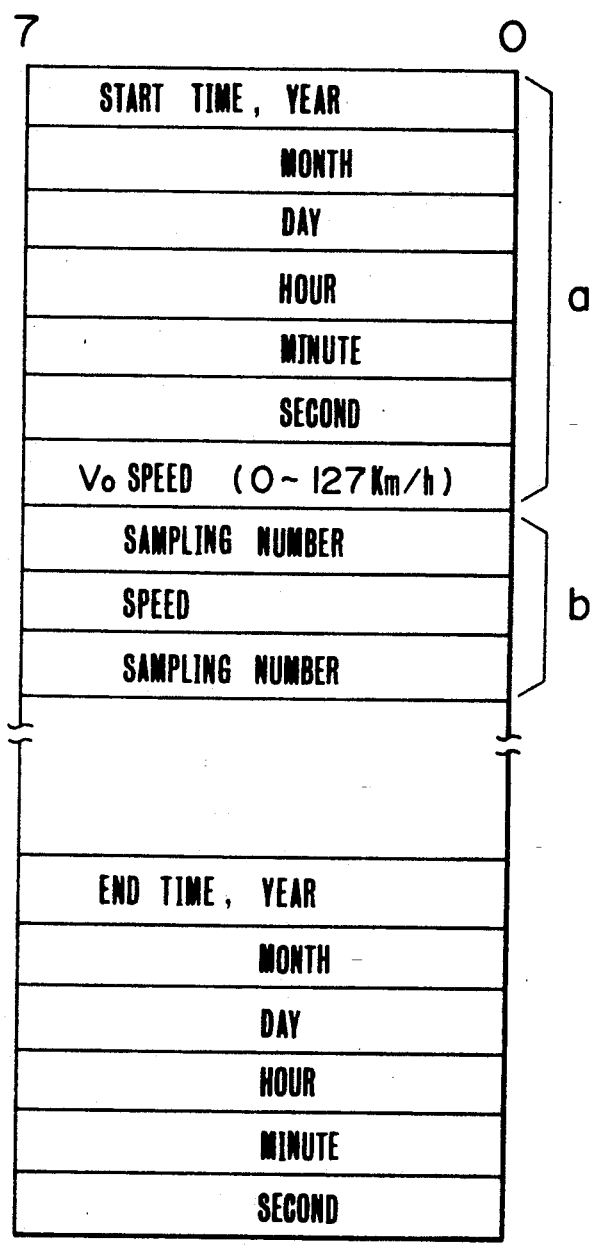
FIG. 19 is an illustration for explaining a recording format of compressed data in the prior art.

In FIG. 9, the permissible error range A is set to ±2 km/h; the sampling period is set to 0.5 second; and the ranges AH and AL are set to be equal to the permissible error range A in the same manner as in FIG. 18.

Although the present invention is applied to the digital tachograph in the above preferred embodiment, it may be applied to any other data recording devices.

There will now be described a second preferred embodiment of the present invention with reference to FIGS. 10 to 16.

Figure 10:
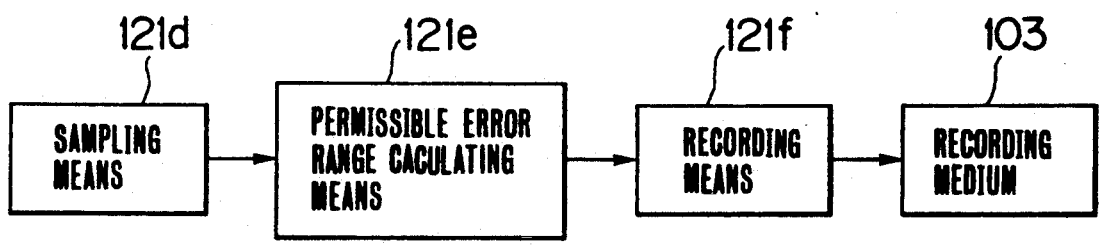
FIG. 10 is a block diagram showing a basic construction of the speed data recording device according to the second aspect of the present invention.
Figure 11:
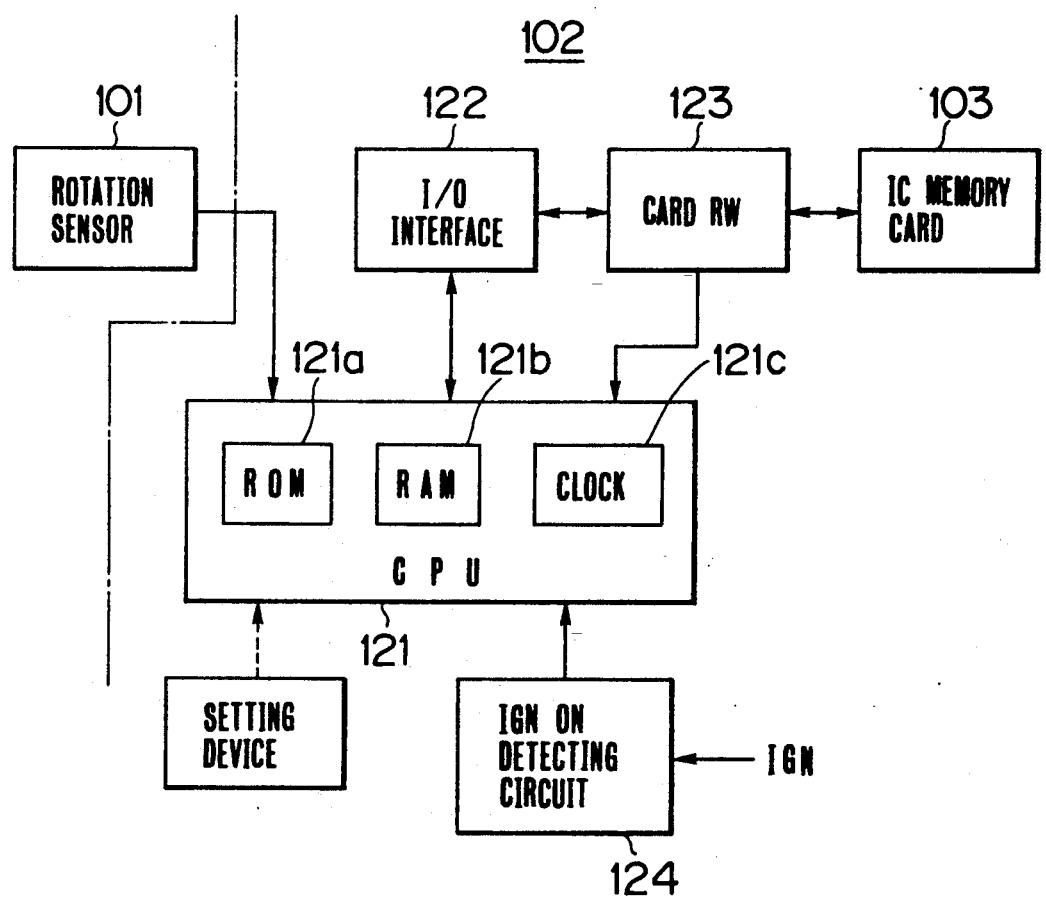
FIG. 11 is a block diagram showing a preferred embodiment of the speed data recording device.

Referring to FIG. 10, reference numeral 101 designates a rotation sensor for detecting rotation of an axle from a transmission of a vehicle (not shown) and converting a rotational speed of the axle into an electric signal. The rotation sensor 101 is connected to a speed data recording device 102 constituting a digital tachograph for the vehicle. The speed data recording device 102 serves to sample input signals from the axle rotation sensor 101, compute an instantaneous speed and a travel distance, carry out the data compression processing as mentioned above, and record compressed data. The speed data recording device 102 includes a microcomputer (CPU) 121 including a ROM 121a storing a control program or the like, RAM 121b to be used as a working area, and a clock 121c for generating real time data consisting of year, month, day, hour, minute and second, a card reader/writer (RW) 123 connected through an I/O interface 122 to the CPU 121, and an IGN on detecting circuit 124 for detecting an on-state of an ignition (IGN) switch of the vehicle. Further, an IC memory card 103 as the recording medium according to the present invention is detachably connected through the card RW 123 to the CPU 121. The CPU 121 serves to directly monitor whether the IC memory card 103 is in a recordable state. When the IC memory card 103 is attached to the card RW 123, a travel data can be recorded into the IC memory card 103.

Figures 12, 13:
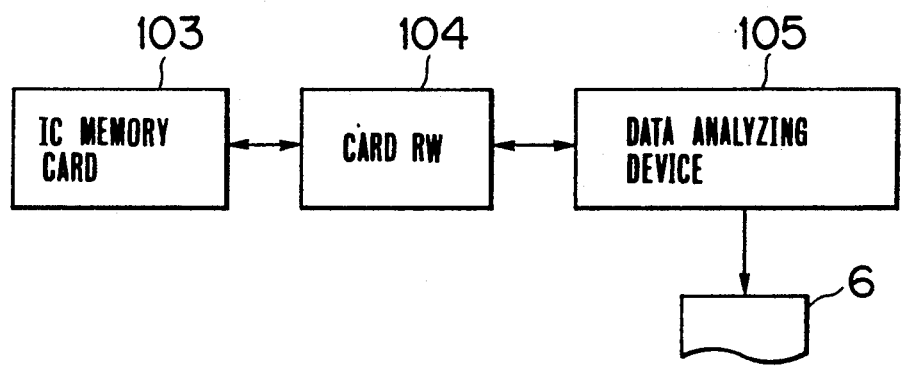
FIG. 12 is a schematic block diagram of a speed data analyzing device.
FIG. 13 is an illustration for explaining the relationship between a tolerance and a resolution, a manner of coding of the tolerance, and the number of bits to be used for recording a speed data.

Referring to FIG. 12, the IC memory card 103 detached from the speed data recording device 102 is connected to a card RW 104 for reading contents recorded in the IC memory card 103 and clearing the data recorded in the IC memory card 103 after completion of reading so as to reset the IC memory card 103 and make the same re-usable. The card RW 104 is connected to a data analyzing device 105 for saving the speed data transferred from the card RW 104 into a magnetic recording medium such as a floppy disk, analyzing the compressed data, regenerating the travel circumstance, and printing the result of totalization and a graph thereof on an output paper 106. At the same time when the contents in the IC memory card 103 are cleared to be initialized by the card RW 104, a set value data such as the above-mentioned tolerance to be used in the compression processing of the speed data is recorded into the IC memory card 103.

When the vehicle mounting the speed data recording device 102 thereon is traveled, the rotation sensor 101 generates pulse signals and supplies the same to the CPU 121. Then, according to the input pulse signal, the CPU 121 measures an instantaneous speed with a predetermined resolution at every sampling period which is previously determined according to the set value data, and carried out compression processing of the measured speed data according to the tolerance predetermined according to the above set value data, then writing the result of compression processing into the IC memory card 103. As mentioned above, when the IC memory card 103 is attached to the card RW 123, the set value data is read from the IC memory card 103 and is stored into the RAM 121b in the CPU 121. The CPU 121 is operated by a control program so as to function as a control device for generalizing all functions of the speed data recording device.

As shown in FIG. 13, the relationship between the tolerance and the resolution is such that the resolution must be increased with a decrease in the tolerance. Further, it is necessary to record a fraction part of the speed data when the tolerance is ±2.0 km/h or less. Further, FIG. 13 also shows the relationship between the tolerance and a required number of bits for recording the speed data.

In the case that the tolerance is set to ±1 km/h, the resolution becomes 1.8 km/h (0.125 km/h), and the fraction part of the speed data must be also recorded. The fraction part can be expressed by three bits provided that 0.125 km/h is recorded per bit. As shown in FIG. 14, an integer part of the speed data in the range of 0–191 km/h is recorded by using all eight bits of one byte, and the fraction part is recorded by using leftmost three bits of the next one byte. In the case that a sampling number is 31 or less, it is recorded by using remaining five bits of this byte. Accordingly, when the sampling number is small, the speed data and the sampling number can be recorded as 2-byte data.

In the case that the sampling number is 32 or more, high-order digits of the sampling number represented by a binary number are recorded by using the further next byte. Thus, in this case, the speed data and the sampling number are recorded as 3-byte data. In this case, information of indicating that the sampling number is recorded in the third byte is recorded by recording "11" in leftmost two bits of the third byte, so as to discriminate the sampling number from the speed data. Since the speed data of 191 km/h is expressed as "B1011 1111" by a binary number, the leftmost two bits of the speed data does not become "11".

Figure 15:
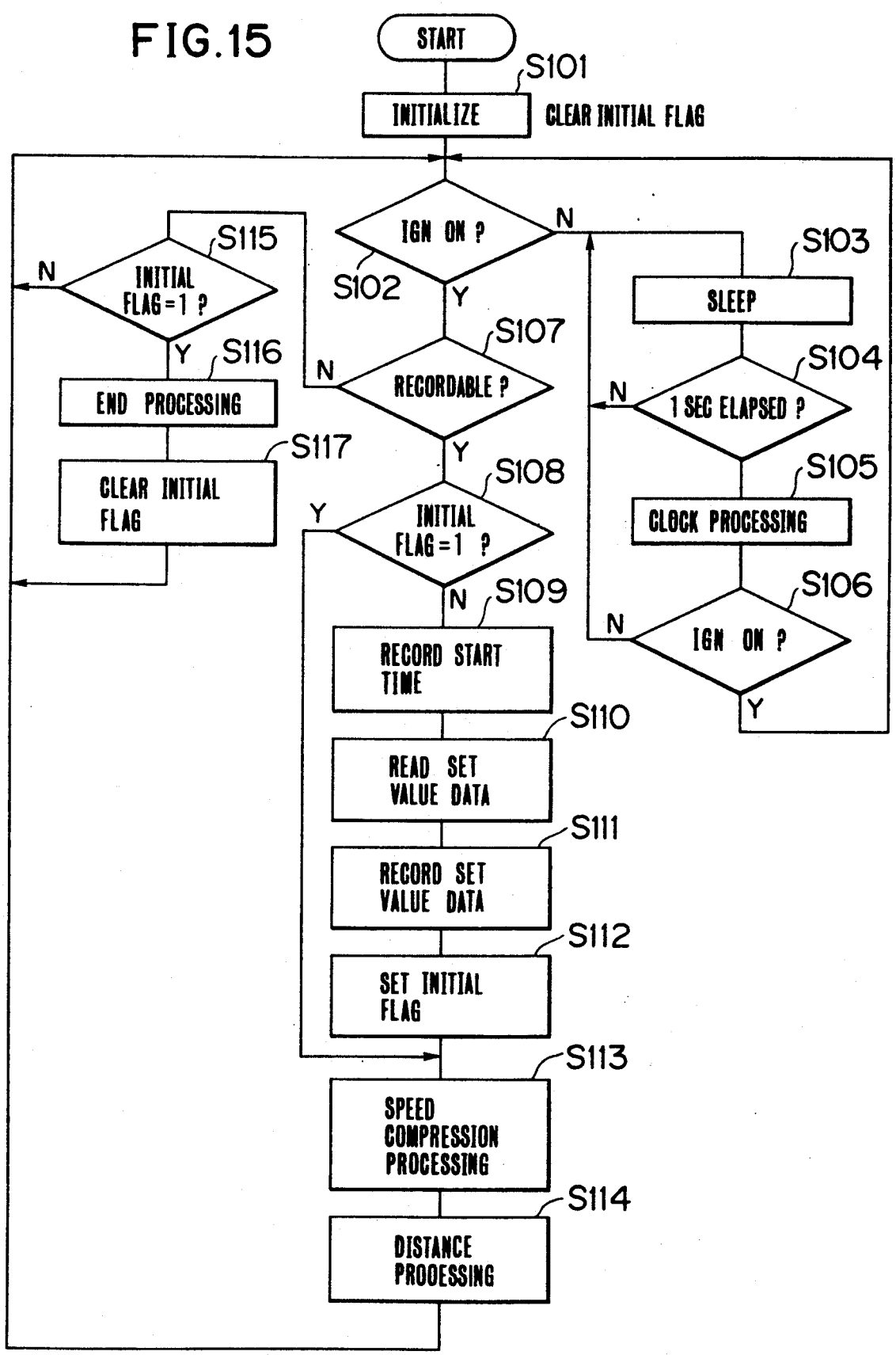
FIGS. 15 and 16 are flowcharts of the operation to be carried out by a CPU shown in FIG. 11.

While the operation of the speed data recording device has been schematically described, the operation to be carried out by the CPU 121 according to the predetermined control program will now be described in detail with reference to the flowchart shown in FIG. 15.

The CPU 121 starts to be operated by supplying a power, and carried out initialization in step S101 to clear an initial flag. In the next step S102, the CPU 121 monitors a signal from the IGN on detecting circuit 124, and determines whether or not the IGN switch is turned on. If the answer in step S102 is NO, the program goes to step S103 to make a sleep state. In the next step S104, it is determined whether or not one second has elapsed. If the answer in step S104 is YES, a clock processing is executed in step S105 to set the clock 121c forward by one second. In the next step S106, it is determined again whether or not the IGN switch is turned on. If the answer in step S106 is NO, the steps S103 to S106 are repeatedly executed. If the answer in step S106 is YES, the program returns through step S102 to step S107. In step S107, it is determined whether or not the IC memory card 103 is attached to the card RW 123, that is, whether or not the IC memory card 103 is in the recordable state. If the answer in step S107 is YES, the program proceeds to step S108.

In step S108, it is determined whether or not the initial flag is 1. If the answer in step S108 is NO, the program proceeds to step S109. In step S109, a start time is recorded as year, month, day, hour, minute and second by using six bytes into the IC memory card 103. Then, in step S110, a set value data previously recorded in the IC memory card 103 upon initialization of the IC memory card 103 by the card RW 104 is read from the IC memory card 103. In the next step S111, the resolution coded is recorded into a given area of the IC memory card 103, e.g., by using leftmost two bits of the byte where the month of the start time is recorded. The coding of the resolution is shown by A and B in FIG. 13, for example.

In the next step S112, the initial flag is set to 1. Then in step S113, a speed compression processing subroutine is executed. Then in step S114, a distance processing subroutine is executed. Then, the program returns to step S102.

When it is detected that the IC memory card 103 becomes unrecordable, and the answer in step S107 accordingly becomes NO, the program goes to step S115. In step S115, it is determined whether or not the initial flag is 1. If the answer in step S115 is YES, an end processing is executed in step S116, and the initial flag is cleared in step S117. Then, the program returns to step S102.

Figure 16:
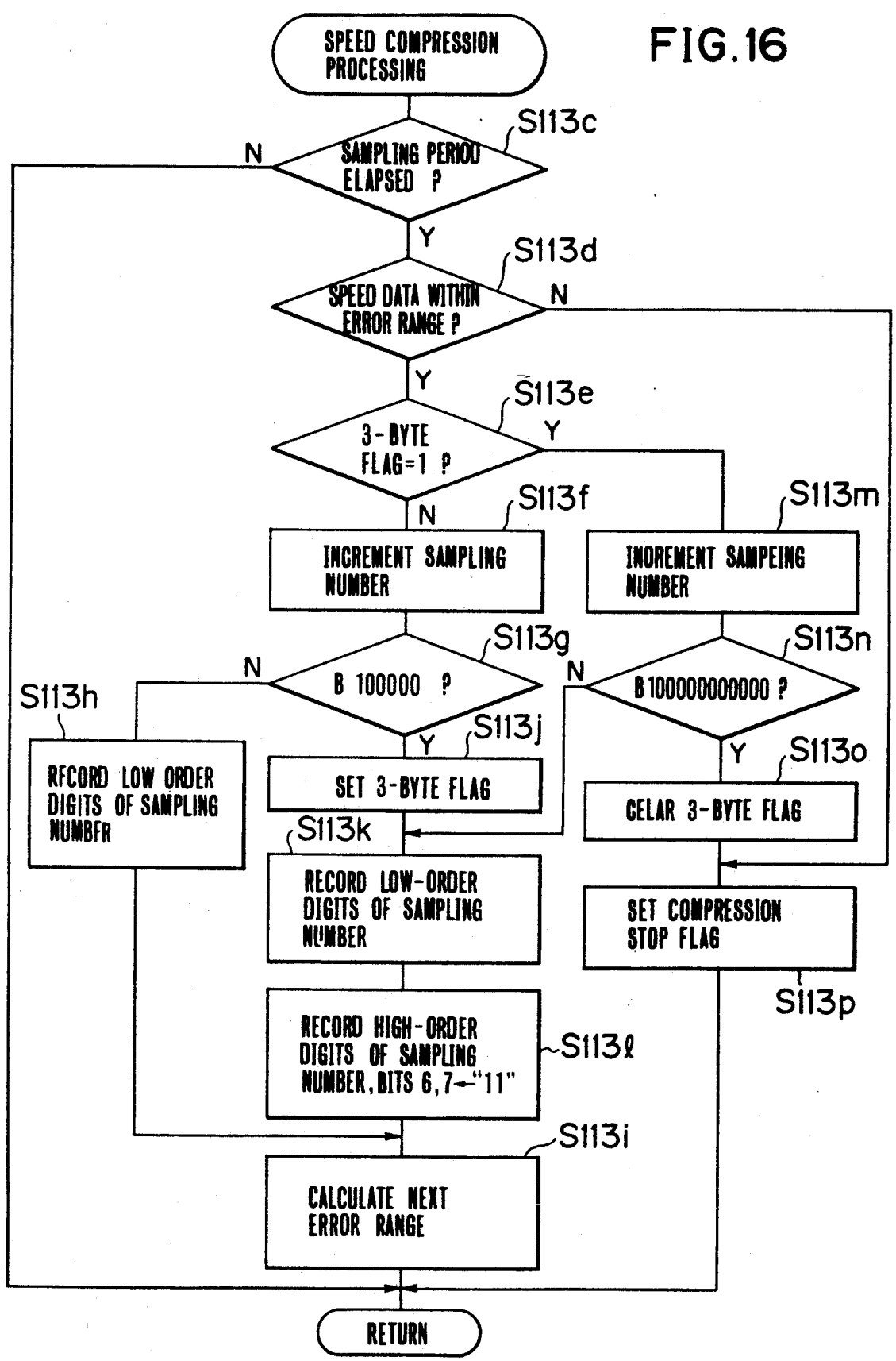

Next, the speed compression processing subroutine will be described with reference to the flowchart shown in FIG. 16.

Firstly in step S113c, it is determined whether or not a sampling period has elapsed. The sampling period is decided according to the set value data read from the IC memory card 103 and stored into the RAM 121b. In this preferred embodiment, the sampling period is set to 0.5 second. If the answer in step S113c is YES, the program proceeds to step S113d, and it is determined whether or not the speed data is in the permissible error range. If the answer in step S113d is YES, the program proceeds to step S113e, and it is determined whether or not a 3-byte flag is 1. Since the 3-byte flag is initially 0, and the answer in step S113e is accordingly NO, the program proceeds to step S113f, and a sampling number is incremented by 1 by writing an incremented count data in a counter area formed in a predetermined memory area of the RAM 121b.

Then in step S113g, it is determined whether or not the sampling number data becomes "B100000" represented by a binary number. If the answer in step S113g is NO, the program proceeds to step S113h. The binary number "B100000" is decided according to the set value data. That is, if the fraction part of the speed data is recorded at two bits, the binary number becomes "B1000000"; if the fraction part is recorded at one bit, the binary number becomes "B10000000"; and if the fraction part is recorded at zero bit, that is, if the speed data has no fraction part, the binary number becomes "B100000000". In step S113h, low-order digits of the sampling number data are recorded at the remaining five bits of the byte where leftmost three bits have been used for recording the fraction part of the speed data. Then, the program proceeds to step S113i to calculate the next error range and then returns to the main routine shown in FIG. 15.

After the compression recording of the speed data proceeds, and the answer in step S113g becomes YES, that is, the sampling number data becomes "B100000", the program proceeds to step S113j, and the 3-byte flag is set to 1. Then in step S113k, low-order digits of the sampling number data are recorded at the previous recording bits used in step S113h so as to substitute the present data for the previous data. In the next step S113l, high-order digits of the sampling number data are recorded by using rightmost six bits of the next byte, and the information "11" is recorded by using the remaining leftmost two bits of this byte. Then, the program proceeds to step S113i.

Since the 3-byte flag is set to 1 in step S113j, the answer in step S113e in the next routine becomes YES, and the program proceeds to step S113m. In step S113m, the sampling number is incremented. In the next step S113n, it is determined whether the sampling number becomes "B100000000000" represented by a binary number. If the answer in step S113n is NO, the program goes to step S113k. The binary number "B100000000000" is also decided according to the set value data such that it varies with the required number of bits for recording the fraction part.

If the answer in step S113n becomes YES, the program proceeds to step S113o, and the 3-byte flag is cleared. In the next step S113p, a compression stop flag is set. Then, the program returns to the main routine shown in FIG. 15. Further, if the answer in step S113d is NO, that is, if the speed data is out of the error range, the program proceeds to step S113p to set the compression stop flag and then returns to the main routine shown in FIG. 15.

In the above preferred embodiment, the set value data is previously recorded in the IC memory card 103 by the data analyzing device, and is read into the recording device 102. However, as shown by a dashed line in FIG. 11, an independent setting device for setting the set value data may be provided in the recording device 102.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a CPU implemented method of recording velocity data of a vehicle in a memory medium including the steps of
   a) sampling said velocity data to be recorded at a predetermined period,
   b) calculating line segments with respect to the velocity data at respective sampling timings by use of a permissible error range thereof,
   c) deciding a straight line intersecting said line segments,
   d) recording a length of said straight line represented by a sampling number and the velocity data at an end point of said straight line, whereby compression processing of the velocity data sampled is carried out, and the data compressed is recorded in said memory medium, and
   e) detecting a sampling timing where said straight line intersects no line segment as an inflection point of the velocity data obtained in said sampling step;
   f) stopping said compression processing when said inflection point is detected; the improvement comprising the step of:
   g) setting predetermined ranges at respective sampling timings where said straight line intersects said segment lines,
   h) detecting predetermined successive number of sampling timings where the velocity data are found in said respective predetermined ranges, and
   i) stopping said compression processing when said predetermined successive number of sampling timings is detected.

2. A data recording method according to claim 1, wherein said setting step g) includes
   j) determining a first straight line starting from initial velocity data and passing through an upper permissible error range above current velocity data,
   k) determining a second straight line starting from said initial velocity data and passing through a lower permissible error range below the current velocity data, and
   l) defining at a next sampling timing a first predetermined range across said first straight line and a second predetermined range across said second straight line.

3. A data recording method according to claim 1, further repeating the steps a) through i) subsequent to either one of said compresion processing stopping steps f) or i).

4. A device for recording velocity data of a vehicle including
   sampling means for sampling said velocity data to be recorded at a predetermined period,
   line segment calculating means for calculating line segments with respect to the velocity data sampled by said sampling means at respective sampling timings by use of a permissible error range thereof, and
   recording means for deciding a straight line intersecting said line segments calculated by said line segment calculating means and recording a length of said straight line represented by a sampling number obtained by said sampling means and the velocity data at an end point of said straight line,
   compression processing means for compression processing of the velocity data sampled,
   means for recording the compressed data,
   inflection point detecting means for detecting a sampling timing where said straight line intersects no line segments as an inflection point of the velocity data sampled by said sampling means;
   first means for stopping said compression processing when said inflection point is detected by said inflection point detecting means,
   means for setting predetermined ranges at respective sampling timings where said straight line intersects said segment lines, means for detecting predetermined successive number of sampling timings where the velocity data are found in said respective predetermined ranges, and second means for stopping said compression processing when said predetermined successive number of sampling timings is detected.

5. A data velocity data recording device according to claim 4, wherein said setting means includes means for determining a first straight line starting from initial velocity data and passing through an upper permissible error range above current velocity data, means for determining a second straight line starting from initial velocity data and passing through a lower permissible error range below said current velocity data, and means for defining at a next sampling timing a first predetermined range across said first straight line and a second predetermined range across said second straight line.

6. A CPU implemented method of recording velocity data of a vehicle in a memory medium, comprising the steps of:

sampling said velocity data of said vehicle at a predetermined period and temporarily storing the sampled velocity data into said memory medium;

compressing the sampled velocity data beginning at a first sampling timing; and recording the velocity data obtained by the compression onto said memory medium;

wherein the velocity data compressing step includes the steps of;

calculating a permissible error range with respect to the velocity data at each sampling timing after the first sampling timing;

detecting, at each sampling timing after the first sampling timing, whether or not a virtual straight line virtually drawn from the velocity data at the first sampling timing to the permissible error range with respect to the velocity data at the current sampling timing crosses all of the permissible error ranges with respect to the velocity data at an intermediate sampling timing or timings between the first and current sampling timings and whether or not the velocity data at the current sampling timing is within a predetermined range at or around an end of the permissible error range at the current sampling timing;

determining, when the detection that the velocity data is within the predetermined range takes place successively at a predetermined plurality of sampling timings, the last one of the sampling timings as a second sampling timing or determining, when the virtual straight line does not cross all of the permissible error ranges with respect to the velocity data at the intermediate sampling timing or timings between the first and current sampling timings, the sampling timing preceding the current sampling timing as the second sampling timing; and determining the second sampling timing as the first sampling timing for a next data compressing operation, thereby completing the present data compressing operation;

the velocity data at the second sampling timing and the number of sample data from the first to the second sampling timing being recorded as compressed data onto the memory medium.

7. A method as claimed in claim 6, wherein the predetermined range at the detecting step is identical with the permissible error range with respect to the velocity data at the current sampling timing.

8. A method as claimed in claim 6, wherein the predetermined range at the detecting step is set for each of the opposite ends of the permissible error range at the current sampling timing, and the first determining step determines, when it is detected successively at the predetermined plurality of sampling timings that the velocity data is within a fixed one of the predetermined ranges, the last one of the sampling timings as the second sampling timing.

9. A method as claimed in claim 6, wherein the step of detecting whether or not the velocity data at the current sampling timing is within the predetermined range is inhibited until after a predetermined interval of time which is longer than the predetermined period for sampling elapses after each first sampling timing.

10. A method as claimed in claim 9, wherein the predetermined period for sampling is 0.5 seconds and the predetermined interval of time for inhibition of the detecting step is 3 seconds.

* * * * *